Dec. 11, 1962   P. J. McINNISH   3,068,370
ULTRASONIC PROBE

Filed Dec. 29, 1958   3 Sheets-Sheet 2

Paul J. McInnish,
INVENTOR.

BY
ATTORNEYS.

Dec. 11, 1962 P. J. McINNISH 3,068,370
ULTRASONIC PROBE
Filed Dec. 29, 1958 3 Sheets-Sheet 3

Paul J. McInnish,
INVENTOR.

BY
S. J. Rotondi
A. J. Dupont
H. M. Snyder
W. P. Murphy,
ATTORNEYS.

United States Patent Office 3,068,370
Patented Dec. 11, 1962

3,068,370
ULTRASONIC PROBE
Paul J. McInnish, 1408 Highland Ave., Huntsville, Ala.
Filed Dec. 29, 1958, Ser. No. 783,621
5 Claims. (Cl. 310—8.7)
(Granted under Title 35, U.S. Code (1952), sec. 266)

The invention described herein may be manufactured and used by or for the Government for governmental purposes without the payment of any royalty thereon.

My invention relates to ultrasonic devices for inspecting the structural uniformity of specimens, and more particularly to such a device having a hydraulic probe.

In a conventional structural testing apparatus, a transducer is electronically powered to generate supersonic waves for transmission thereof to a specimen. In such a specimen having uniform material the waves are reflected by the surfaces of the material and the reflected waves are reconverted into electronic signals by the transducer. A reflectoscope disposed to detect the electronic signals is provided with a screen for visual representation of the uniformity of the material of the specimen.

The opposite surfaces of a specimen are represented by lines spaced on the screen and the waves are similarly reflected from the surfaces of cavities and occlusions within the material of the specimen to present typical representations between the lines. Characteristics of the representations are ascertained by destruction of sample specimens.

A conventional tester requires the specimens to be submerged in water for efficient transmission of the ultrasonic waves between the transducer and the specimen. Such a requirement severely limits application of the testing procedure and when the specimens to be tested comprise large units such as body portions of a missile, application of the procedure is impractical.

Conventional testers include windows disposed for direct contact with the specimens to be tested. Such contact cumulatively damages the window material to cause blurred representations on the screen.

The employment of a single transducer for simultaneously propagating the ultrasonic waves and detecting the ultrasonic signals received from the specimens in the conventional tester creates electrical noise in the receiving circuit to decrease definition of the representation.

It is an object of my invention therefore to provide such a tester having a hydraulic probe.

Another object of my invention is to provide such a probe with a chamber for hydraulic engagement between the transducer and the specimen.

An additional object of my invention is to provide such a tester with separate probes respectively for propagation of the ultrasonic waves and detection thereof.

Other aims and objects of my invention will appear from the following description.

In carrying out my invention, an ultrasonic tester is provided with a test probe having an electronic powered transducer to provide ultrasonic waves and a tubular structure adjacent the diaphragm thereof for engagement with the specimen to form a chamber for fluid to transmit the ultrasonic waves between the transponder and the specimen. The test probe includes a stand pipe and a bleeder pipe communicating with the chamber to fill the chamber with the fluid.

In an alternative embodiment of my invention, a tester is provided with separate probes for propagating the ultrasonic waves and for detection thereof for increased clarity of the representation.

In such a device the probe can be moved over a specimen for continuous inspection of the material thereof. The reflected signals remain clear since the hydraulic fluid is employed as the transmission medium between the transducer and the specimens.

For more complete understanding, reference is directed to the following description and accompanying drawing, in which:

FIG. 3 is a perspective view of an alternate embodiment of my invention with a pair of probes disposed at equal angles of incidence and reflection to a specimen;

Figure 1:
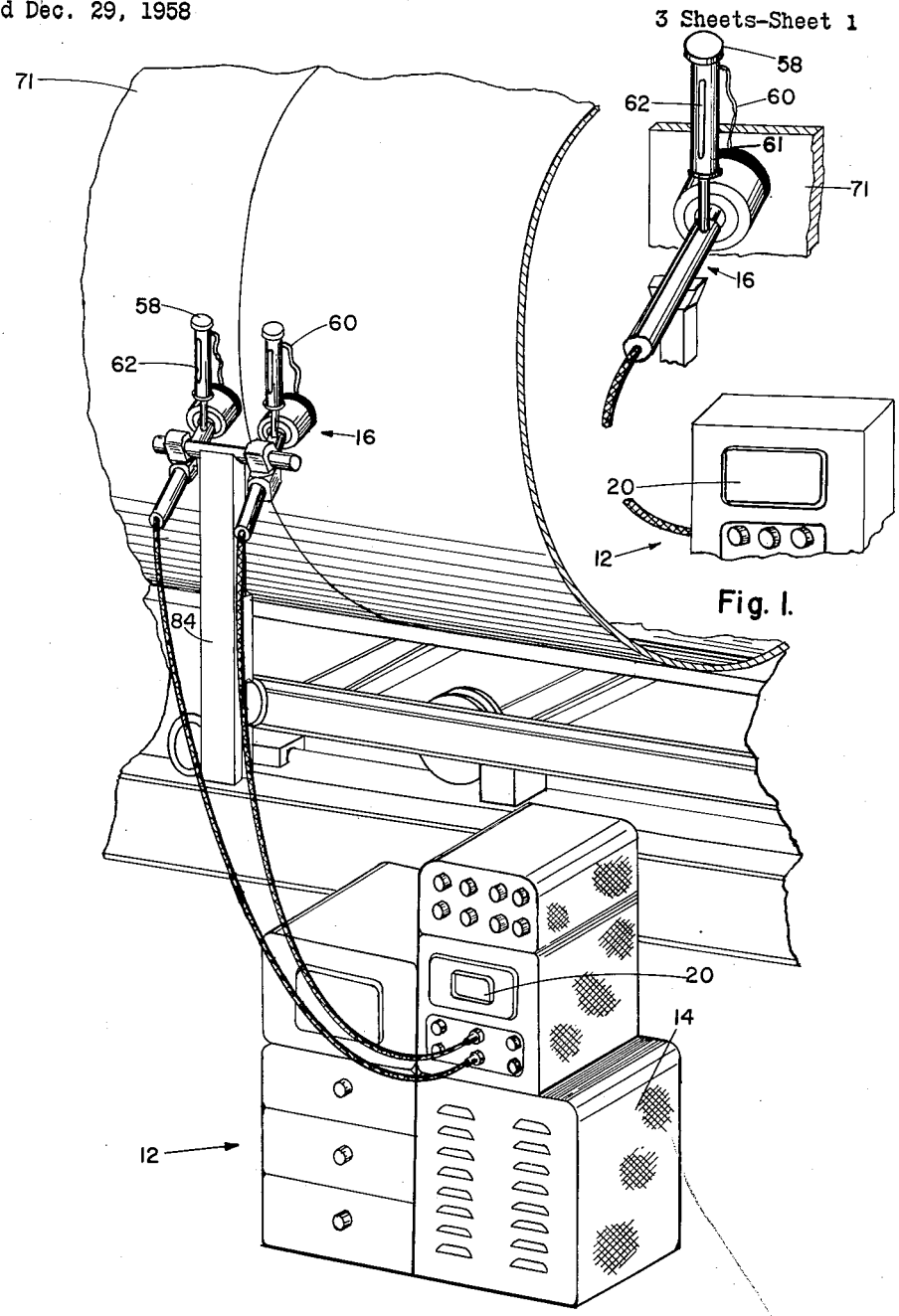
FIG. 1 is a perspective view of a tester with a single probe incorporating my invention.

In accordance with the drawing, a machine 12 for testing homogeneity of the material of a specimen 71 includes a source of electronic power 14, a test probe 16 and a reflectoscope 20 with a screen for representation of electronic signals.

Probe 16 includes a body 22, a head 24 and a joint therebetween including a ball 26 secured to body 22 with polar stub shafts 27 projecting from the ball. A pair of members 30 and 32 are secured together by bolts 34 to form a socket enclosing ball 26 and stub shafts 27 for pivoted engagement therewith. A housing 36 includes a flange 38 to enclose an aperture and member 30 is secured in engagement therewith by a ring 40 in threaded engagement with the housing. Flange 38 is spaced from member 30 by a spring 42. A resilient seal 44 is threaded to housing 36 for engagement with flange 38, ball 26 and the surface of specimen 71. A ring 46 is threaded in body 22 to dispose a diaphragm 48 of a transducer 50 adjacent a cavity 52 of body 22 communicating into seal 44. An O-ring 54 is disposed adjacent diaphragm 48. A drain cock 56 in threaded relation with body 22 at 57 communicates with cavity 52.

A stand pipe 58 and a bleeder tube 60 respectively communicate with cavity 52 and seal 44 at 59 and 61 the high point of cavity 52 to fill cavity 52 with hydraulic fluid. Bleeder tube 60 communicates with stand pipe 58 to eliminate air pockets in cavity 52. A sight glass 62 is provided in stand pipe 58 to indicate height of fluid therein, and seal 44 is provided with fins 64 for engagement with a specimen and a flange 66 for engagement with ball 26 and member 30 to prevent leakage of the hydraulic fluid from cavity 52. Water and glycerine were found to be the most effective fluids for transmission of the ultrasonic waves.

Figure 2:
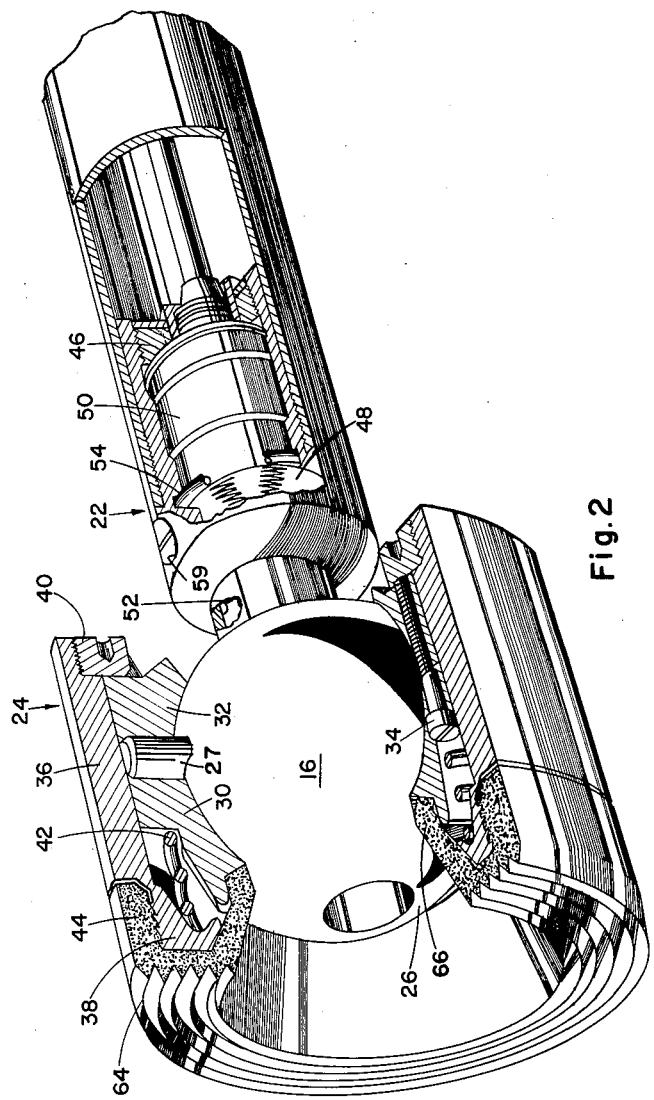
FIG. 2 is a partly cut away perspective view of a probe as shown in FIG. 1.
Figure 5:
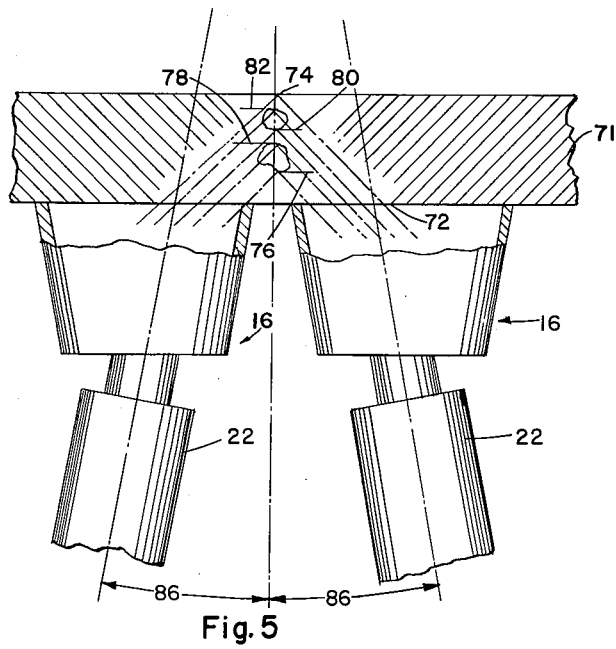
FIG. 5 is a plan view partly in section of the probes in contact with a specimen, and, FIG. 6 shows a presentation on the reflectoscope.
Figure 4:
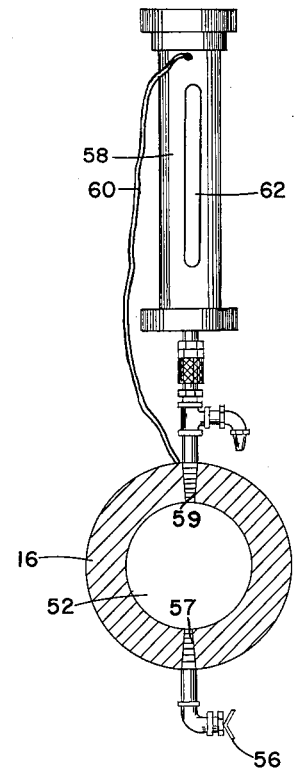
FIG. 4 is a partial section through the probe.

As will be readily apparent from FIGURE 2, the hollow cylindrical housing 36 is open at its opposite ends. With the ball 26 rotatably seated in the outer curved surface of secured together members 30 and 32, one end of the cavity defined by the interior of the housing is closed. It will be observed in FIGURE 2 that at the ball 26 there is an aperture axially therethrough so that hydraulic fluid introduced into the cavity 52 and the cavity defined by the interior of the housing 36 will be in communication with each other. With the ball 26 seated as shown in FIGURE 2, the flange 66 of the seal 44 will effectively seal the ball 26 and the member 30 against leakage of fluid through the ball joint formed by members 30, 32 and the ball 36. Thus, fluid in the interior of the housing 36 will contact the diaphragm 48 so that ultrasonic waves generated by the transducer 50 will energize the diaphragm and transfer the waves through the fluid to a specimen and the fluid will transmit the waves reflected by the specimen to the transducer through the diaphragm.

The electrical supply to the transducer is limited to a half watt of power at substantially 2.5 megacycles frequency for safe handling of the probes by an operator, since as little as 5 watts of power can produce ultrasonic waves with energy enough to produce severe burns upon contact with the operator.

FIG. 3 shows a tester provided with probes 16 respectively connected to electronic source 14 and reflectoscope 20. The probes are disposed respectively to translate electrical energy from source 14 into ultrasonic waves for transmission to the specimens and ultrasonic waves reflected therefrom into signals for operation of reflectoscope 20. The probes are secured to a support 84 of a specimen 71 and respectively disposed at equal angles 86 of incidence and reflection to specimen 71.

Figure 6:
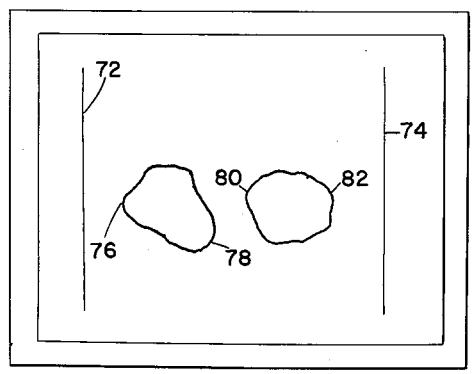

In the representation shown on the reflectoscope screen FIG. 6 lines 72 and 74 depict the front and rear surfaces of the material tested. Surfaces 76 and 78 are the front and rear surfaces of a cavity within the specimen (a volume of lesser density than the specimen material), and 80 and 82 are the front and rear surfaces of an occlusion of higher density within the specimen.

The extent of the cavity and occlusion parallel to the front surface may be obtained by traversing probes 68 and 70 thereover.

While the foregoing is a description of the preferred embodiment, the following claims are intended to include those modifications and variations that are within the spirit and scope of my invention.

I claim:

1. A probe for generating or receiving ultrasonic waves comprising, a hollow body, means carried within said body for generating or receiving ultrasonic waves, a ball carried by said body and spaced outwardly therefrom, a head carried by said ball for rotatable movement thereabout, said head including a hollow housing having an opening therein, said ball having an aperture therethrough to establish comunication between said housing and the interior of said body, a seal carried by said head around said opening for engagement with a specimen to be tested by the probe so that hydraulic fluid may enter said housing and contact the specimen through said opening whereby said fluid may transmit ultrasonic waves between the specimen and said transducer.

2. A probe as in claim 1 wherein said head includes adjoining members disposed interiorly thereof, said members having curved surfaces conforming to the surface of said ball and together forming a socket which receives said ball.

3. A probe as in claim 2 wherein said ball has polar stub shafts projecting therefrom and said members have sockets therein receiving said shafts to provide an axis for rotational movement of said head relative to said ball.

4. A probe for transmitting or receiving ultrasonic waves to or from a specimen to be tested comprising, an elongate hollow body, a transducer for generating or receiving ultrasonic waves disposed transversely of and entirely within said body adjacent one end thereof, a ball carried by said body and spaced longitudinally therefrom, a head carried by said ball for rotational movement thereabout, said head including a hollow housing, having an opening therein, said ball having an aperture therethrough in communication with said housing and the interior of said body at said one end thereof, a flexible seal carried by said head around said opening, fins on said seal for engagement with a specimen to be tested by the probe so that hydraulic fluid may enter said housing and contact the specimen through said opening whereby said fluid may transmit ultrasonic waves between the specimen and said transducer, said housing having adjoining members disposed interiorly thereof, said members having curved surfaces conforming to the surface of said ball and together forming a socket which receives said ball, a pair of outwardly extending polar stub shafts carried by said ball, said members having sockets therein for receiving said shafts, and means carried by said probe in communication with said housing to maintain a desired level of fluid in said housing when said seal engages the specimen.

5. A probe for sending or receiving ultrasonic waves to or from a specimen to be tested comprising, an elongate hollow body, a transducer for generating or receiving ultrasonic waves disposed transversely of and entirely within said body adjacent one end thereof, a diaphragm arranged within and transversely of said body and disposed between said transducer and said one end immediately adjacent said transducer, a ball carried by said body and spaced longitudinally therefrom, a head carried by said ball for rotational movement thereabout, said head including a hollow housing having an opening therein, said ball having an aperture therethrough in communication with said housing and said one end of the body, a seal carried by said head around said opening for engagement with a specimen to be tested by the probe so that hydraulic fluid may enter said housing and contact the specimen through said opening whereby said fluid may transmit ultrasonic waves between said diaphragm and said specimen, said diaphragm being actuated in response to the wave generating action of the transducer and to the reflection of waves transmitted by the fluid from the specimen to thereby actuate the transducer.

References Cited in the file of this patent

UNITED STATES PATENTS

| 2,592,134 | Firestone | Apr. 8, 1952 |
| 2,724,783 | Renaut | Nov. 22, 1955 |
| 2,799,157 | Pohlman | July 16, 1957 |
| 2,852,707 | Kaehms | Sept. 16, 1958 |
| 2,873,391 | Schulze | Feb. 10, 1959 |
| 2,956,185 | Von Stocker | Oct. 11, 1960 |
| 2,992,553 | Joy | July 18, 1961 |

FOREIGN PATENTS

| 213,796 | Australia | Mar. 6, 1958 |